(12) United States Patent
Feng et al.

(10) Patent No.: US 11,702,980 B2
(45) Date of Patent: Jul. 18, 2023

(54) MOBILE POWER SYSTEM

(71) Applicant: YANTAI JEREH PETROLEUM EQUIPMENT & TECHNOLOGIES CO., LTD., Yantai (CN)

(72) Inventors: Ning Feng, Yantai (CN); Qili Cui, Yantai (CN); Ting Zhang, Yantai (CN); Libin Zhou, Yantai (CN); Wanchun Zha, Yantai (CN); Qiong Wu, Yantai (CN); Tao Kou, Yantai (CN); Xin Li, Yantai (CN); Tao Zhang, Yantai (CN); Lili Wang, Yantai (CN); Shuzhen Cui, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 16/838,780

(22) Filed: Apr. 2, 2020

(65) Prior Publication Data

US 2021/0071574 A1 Mar. 11, 2021

(30) Foreign Application Priority Data

Aug. 20, 2019 (CN) .......................... 201910769885.4

(51) Int. Cl.
*F02C 6/00* (2006.01)
*F02C 7/12* (2006.01)
(Continued)

(52) U.S. Cl.
CPC .................. *F02C 6/00* (2013.01); *F02C 7/12* (2013.01); *F02C 7/266* (2013.01); *H02K 7/1823* (2013.01); *F05D 2220/76* (2013.01)

(58) Field of Classification Search
CPC ... F02C 6/00; F02C 7/12; F02C 7/266; H02K 7/1823; F05D 2220/76
See application file for complete search history.

(56) References Cited

U.S. PATENT DOCUMENTS 3,791,682 A * 2/1974 Mitchell ................. F01D 15/10
290/2
4,136,432 A * 1/1979 Melley, Jr. ................ B60P 3/00
29/469
(Continued)

FOREIGN PATENT DOCUMENTS

| CN | 107208557 A | 9/2017 |
|---|---|---|
| CN | 107859536 A | 3/2018 |
| WO | 2019/045689 A1 | 3/2019 |

OTHER PUBLICATIONS

International Search Report dated Mar. 31, 2020, corresponding PCT/CN2019/092668, with English translation, 5 pages.
(Continued)

*Primary Examiner* — Viet P Nguyen
(74) *Attorney, Agent, or Firm* — Xsensus LLP

(57) ABSTRACT

The present invention discloses a mobile power system, the whole mobile power system is assigned onto two transport vehicles, achieving effective integration to reduce transport vehicle and transport cost; the two transport vehicles are connected at the side to enable quick and convenient connection in working state, greatly saving installation time; a gas turbine starter is disposed on an exhaust auxiliary transportation unit so that the mobile power system can be started by a gas turbine in totally power failure conditions.

10 Claims, 2 Drawing Sheets

(51) Int. Cl.
    *F02C 7/266*     (2006.01)
    *H02K 7/18*     (2006.01)

(56)     References Cited

U.S. PATENT DOCUMENTS

| | | | | |
|---|---|---|---|---|
| 2001/0003242 | A1* | 6/2001 | Takamatsu | F01D 15/10 |
| | | | | 60/802 |
| 2002/0056994 | A1* | 5/2002 | Irish | F02C 7/052 |
| | | | | 290/2 |
| 2008/0277944 | A1* | 11/2008 | Schwarz | F02C 7/32 |
| | | | | 290/4 C |
| 2016/0102581 | A1* | 4/2016 | Del Bono | F01D 25/28 |
| | | | | 290/1 A |
| 2016/0177675 | A1* | 6/2016 | Morris | F02C 7/20 |
| | | | | 166/308.1 |
| 2017/0104389 | A1* | 4/2017 | Morris | E21B 41/00 |
| 2017/0133909 | A1* | 5/2017 | Morales Ivarez | F02C 7/00 |
| 2018/0080376 | A1 | 3/2018 | Austin et al. | |
| 2018/0080377 | A1* | 3/2018 | Austin | B60D 1/00 |
| 2019/0055887 | A1* | 2/2019 | Giancotti | F02C 7/18 |
| 2019/0063326 | A1 | 2/2019 | Davis | |
| 2019/0204021 | A1* | 7/2019 | Morris | F02C 6/18 |
| 2019/0353303 | A1* | 11/2019 | Morris | F17C 5/06 |

OTHER PUBLICATIONS

Written Opinion dated Mar. 31, 2020, corresponding PCT/CN2019/092668, 4 pages.

\* cited by examiner

MOBILE POWER SYSTEM

TECHNICAL FIELD

The present invention relates to the technical field of power generation, and specifically to a mobile power system.

BACKGROUND

The oil and gas industry generally adopts hydraulic fracturing to promote the production of hydrocarbon wells (for example, oil or gas wells). Conventional fracturing equipment generally has the problems of occupying a large area, causing severe environmental pollution and so on, failing to satisfy the increasingly serious environmental requirements and the requirements on the area occupied by well-site operations.

A complete set of electric drive fracturing equipment will effectively reduce the discharge of environmental pollutants, the occupied area, noise and the operation and maintenance costs. With the use of a complete set of electric drive fracturing equipment and the continuous increase of the power of the electric drive fracturing equipment, higher requirements are imposed on power supply at the operation site. At the well-site, the power supply for fracturing equipment generally cannot be realized by using a power grid. Moreover, the fracturing operation has the characteristic of short operation cycle, and fracturing equipment needs to be moved among different well-sites. Generally, because various parts of a power supply system require different assembly, transportation and installation methods, the installation time of the power supply system will be up to half to one month.

Therefore, how to provide a mobile power supply system which can be installed quickly and conveniently at the electric drive fracturing operation site is currently a great challenge for electric drive fracturing operations.

SUMMARY

To overcome the deficiencies in the prior art, an objective of the present invention is to provide a mobile power system, the whole mobile power system is assigned onto two transport vehicles, achieving effective integration to reduce transport vehicle and transport cost; the two transport vehicles are connected at the side to enable quick and convenient connection in working state, greatly saving installation time; a gas turbine starter is disposed on an exhaust auxiliary transportation unit so that the mobile power system can be started by a gas turbine in totally power failure conditions.

The objective of the present invention is achieved by the following technical measures: a mobile power system includes a turbine generation transportation unit and an exhaust auxiliary transportation unit, the exhaust auxiliary transportation unit is connected to at least one side of the turbine generation transportation unit, the turbine generation transportation unit includes an air intake system, a gas turbine, a generator and a first transport vehicle, the gas turbine converts hydrocarbon fuel into mechanical energy of an output shaft, the air intake system is disposed on the inlet side of the gas turbine to provide combustion-supporting air for the conversion process; the generator is disposed at an output end of the gas turbine to convert mechanical energy into required electrical energy; the exhaust auxiliary transportation unit includes an exhaust system, a cabin ventilation and cooling system and a second transport vehicle, the exhaust system and the cabin ventilation and cooling system are disposed on the second transport vehicle, the exhaust system is connected to the exhaust port of the gas turbine, the cabin ventilation and cooling system is connected to the cabin of the gas turbine.

Further, the exhaust auxiliary transportation unit includes a gas turbine starter, the gas turbine starter is used to start the gas turbine by the mobile power system in totally power failure conditions, the gas turbine starter is a generator set or a battery capable of self-starting.

Further, the turbine generation transportation unit further includes a power control unit, the power control unit includes an electric power unit and a control unit, the electric power unit is configured to output electric power from the generator, the control unit includes a gas turbine control unit and a generator control unit, the gas turbine control unit acts on the gas turbine, and the generator control unit acts on the generator.

Further, the exhaust system includes an exhaust joint, an exhaust silencer and an exhaust stack which are connected in sequence, the exhaust silencer and the exhaust stack are arranged as a whole, the other end of the exhaust joint is connected to the exhaust port of the gas turbine; during transportation, the exhaust silencer and the exhaust stack are placed horizontally, while in working state, the exhaust silencer and the exhaust stack are positioned vertically.

Further, while in working state, the exhaust joint is moved to the side of the second transport vehicle through a slide rail at the bottom.

Further, while in working state, the exhaust silencer and the exhaust stack are rotated from horizontal to vertical through a lifting mechanism.

Further, the exhaust system is connected to the side of the turbine generation transportation unit.

Further, the cabin ventilation and cooling system is connected to the side of the turbine generation transportation unit.

Further, the exhaust auxiliary transportation unit is further provided with a set of hydraulic walking device, which is used for fine adjustment of the second transport vehicle in directions of up and down and side to side while in working state, enabling faster docking with the turbine generation transportation unit.

Compared with the prior art, the present invention has the following beneficial effects: 1. the whole mobile power system is assigned onto two transport vehicles, achieving effective integration to reduce transport vehicle and transport cost. 2. The two transport vehicles are connected at the side to enable quick and convenient connection in working state, greatly saving installation time. 3. A gas turbine starter is disposed on an exhaust auxiliary transportation unit so that the mobile power system can be started by a gas turbine in totally power failure conditions.

The present invention will be described in detail below with reference to the accompanying drawings and specific implementations.

Wherein, 100. turbine generation transportation unit, 200. exhaust auxiliary transportation unit, 101. air intake system, 102. intake joint, 103. gas turbine, 104. generator, 105. power control unit, 106. first transport vehicle, 201. gas turbine starter, 202. cabin ventilation and cooling system, 203. exhaust system, 204. second transport vehicle, 205. exhaust joint, 206. flexible ventilating duct.

DESCRIPTION OF THE EMBODIMENTS

Figure 1:
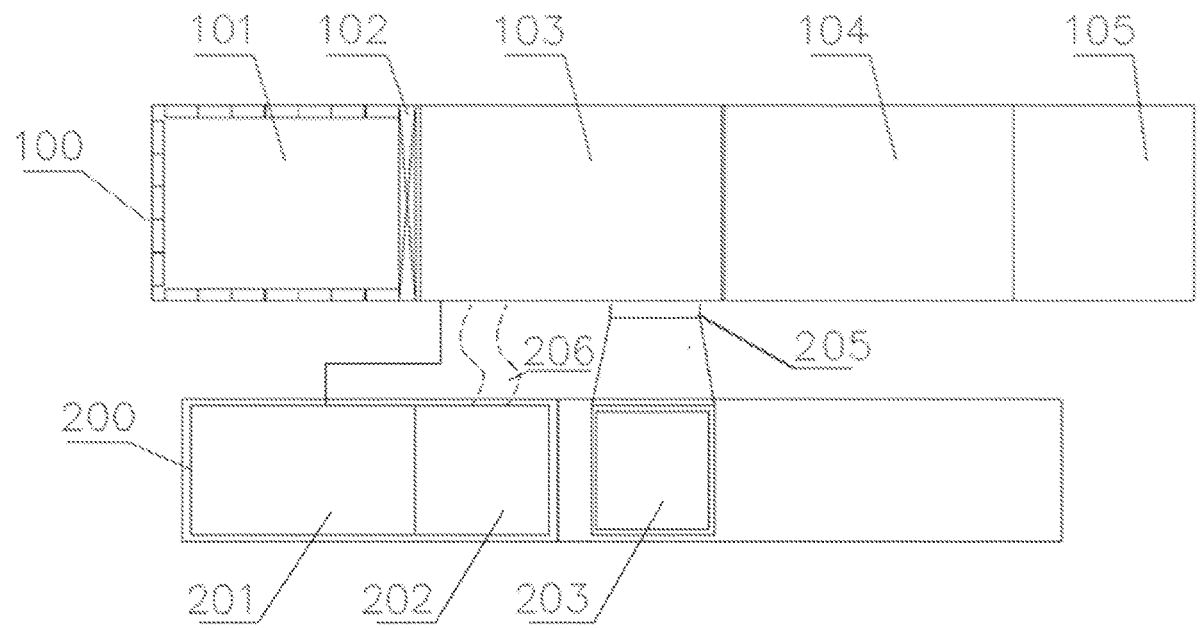
FIG. 1 is a schematic structural diagram of a mobile power system.
Figure 2:
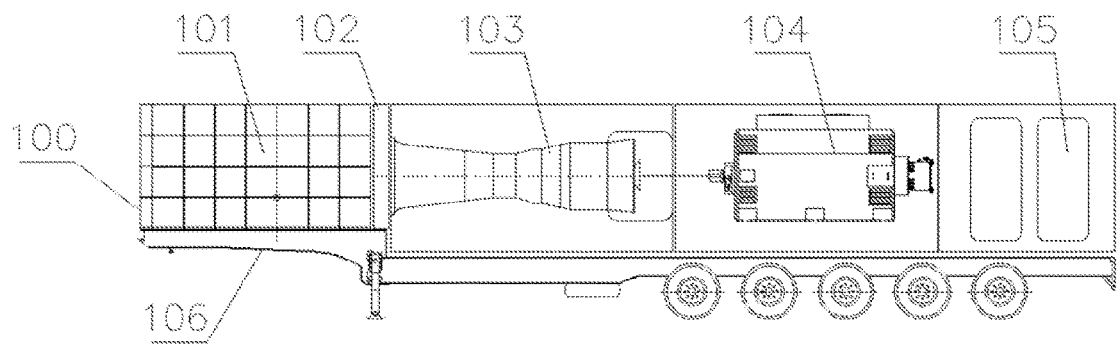
FIG. 2 is a sectional view of a turbine generation transportation unit.
Figure 3:
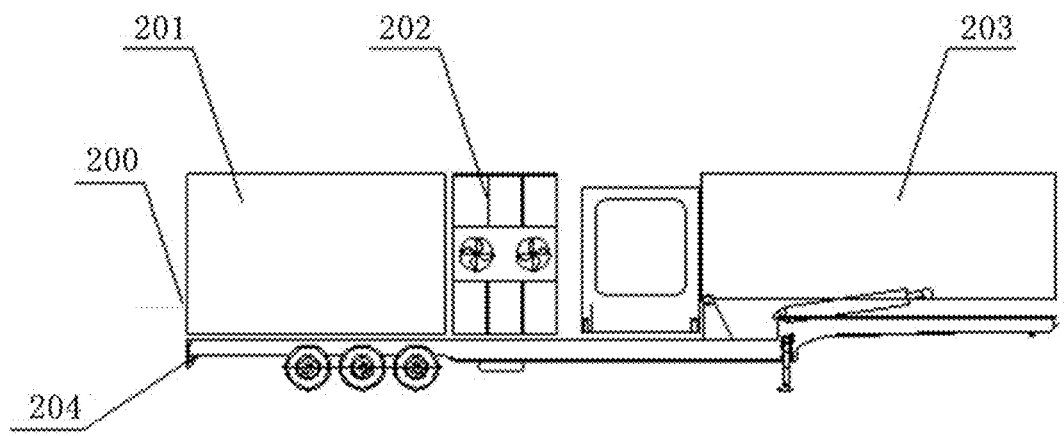
FIG. 3 is a schematic structural diagram of an exhaust auxiliary transportation unit in transport state.
Figure 4:
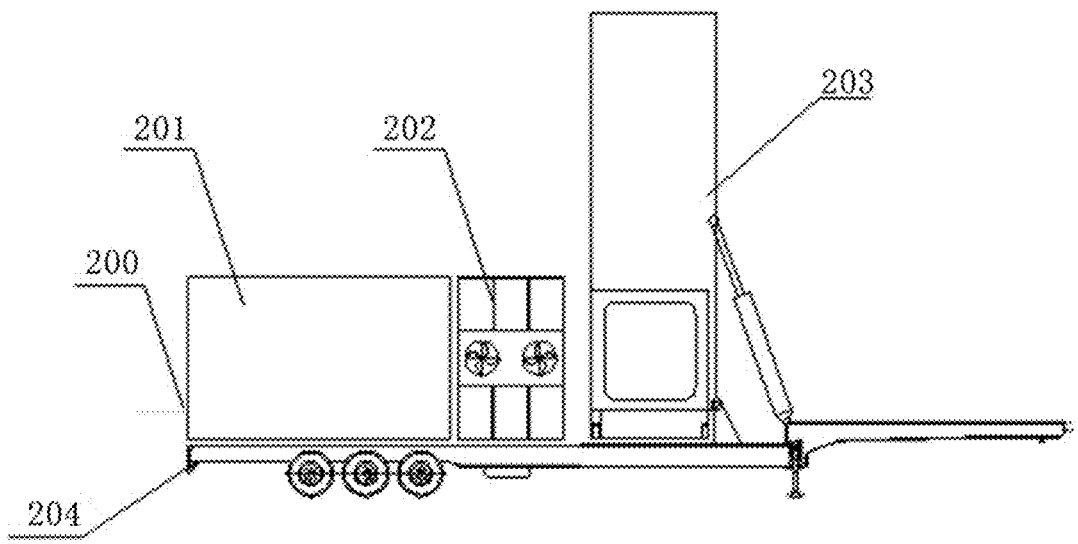
FIG. 4 is a schematic structural diagram of an exhaust auxiliary transportation unit in working state.

As shown in FIGS. 1 to 4, a mobile power system includes a turbine generation transportation unit 100 and an exhaust auxiliary transportation unit 200, the exhaust auxiliary transportation unit 200 is connected to at least one side of the turbine generation transportation unit 100, the turbine generation transportation unit 100 includes an air intake system 101, a gas turbine 103, a generator 104 and a first transport vehicle 106, the gas turbine 103 converts hydrocarbon fuel into mechanical energy of an output shaft, the air intake system 101 is disposed on the inlet side of the gas turbine 103 and connected to an intake port of the gas turbine 103 through an intake joint 102 to provide combustion-supporting air for the conversion process; the air intake system 101 is integrated onto the intake port of the gas turbine 103, and the intake joint 102 adopts a straight-through joint to avoid unnecessary elbows, with small intake pressure losses and a stable flow direction.

The generator 104 is disposed at the side of output shaft of the gas turbine 103 and connected through a countershaft to convert mechanical energy into required electrical energy, the exhaust auxiliary transportation unit 200 includes an exhaust system 203, a cabin ventilation and cooling system 202, a gas turbine starter 201 and a second transport vehicle 204, the exhaust system 203, the cabin ventilation and cooling system 202 and the gas turbine starter 201 are disposed on the second transport vehicle 204; the exhaust system 203 is connected to an exhaust port of the gas turbine 103; the cabin ventilation and cooling system 202 is connected to the cabin of the gas turbine 103 through a flexible ventilating duct, providing clean air for cooling the cabin of the turbine generation transportation unit 100. The gas turbine starter is connected to the gas turbine by a power connection. The gas turbine starter 201 is used to start the gas turbine 103 by the mobile power system in totally power failure conditions independent of other power networks. The gas turbine starter 201 includes a fuel engine and a starter-generator, providing power for starting the gas turbine 103. An air intake system 101, a gas turbine 103 and a generator 104 are integrated in the turbine generation transportation unit 100, eliminating the field connection of the air intake system 101, simplifying the shaft alignment between the power output shaft of the gas turbine and the input shaft of the generator, thus greatly reducing the precision and difficulty of field assembly, and shortening the assembly time.

The turbine generation transportation unit 100 further includes an auxiliary system comprising a lubrication system (providing lubrication for the gas turbine 103 and the generator 104), a fire fighting system (for fire protection of the cabin), a gas supply system (providing fuels for the gas turbine) not shown in figures.

The turbine generation transportation unit 100 further includes a power control unit 105, the power control unit 105 includes an electric power unit and a control unit, the electric power unit is configured to output electric power from the generator 104, the control unit includes a gas turbine control unit and a generator control unit, the gas turbine control unit acts on the gas turbine 103 and the gas turbine auxiliary equipment (e.g., a lubricating oil pump, and the like), and the generator control unit acts on the generator 104. The power control unit 105 is integrated on the turbine generation transportation unit 100 to reduce the workload of field cable connection, and extend the service life of electrical components at the same time.

The exhaust system 203 includes an exhaust joint 205, an exhaust silencer and an exhaust stack which are connected in sequence. The exhaust silencer and the exhaust stack are arranged as a whole, and connected to a second transport vehicle 204 through hinges. The other end of the exhaust joint 205 is connected to an exhaust port of the gas turbine 103. During transportation, the exhaust silencer and the exhaust stack are placed horizontally, while in working state, the exhaust silencer and the exhaust stack are positioned vertically.

While in working state, the exhaust joint 205 is moved to the side of the second transport vehicle 204 through a slide rail at the bottom.

While in working state, the exhaust silencer and the exhaust stack are rotated from horizontal to vertical through a lifting mechanism. The lifting mechanism may be a hydraulic cylinder or the like. The exhaust gas of the gas turbine 103 is discharged into the atmosphere successively through the exhaust port, the exhaust joint 205, the exhaust silencer and the exhaust stack.

The exhaust system 203 is connected to the side of the turbine generation transportation unit 100. The cabin ventilation and cooling system 202 is connected to the side of the turbine generation transportation unit 100. The cabin ventilation and cooling system 202 and the exhaust system 203 are both connected to the side of the turbine generation transportation unit 100 to avoid hoisting, thus reducing operational difficulty and improving operation convenience.

The exhaust auxiliary transportation unit 200 is further provided with a set of hydraulic walking device, which is used for fine adjustment of the second transport vehicle 204 in directions of up and down and side to side while in working state, enabling faster docking with the turbine generation transportation unit 100. The hydraulic walking device includes vertical supporting legs, a horizontal expansion mechanism and a horizontal hydraulic cylinder. The vertical supporting legs include a vertical hydraulic cylinder and a mechanical structure capable of withstanding horizontal forces on the vertical hydraulic cylinder). The second transport vehicle 204 is finely adjusted at height through the expansion of the vertical hydraulic cylinder (e.g., when the exhaust joint 205 needs to be raised or lowered). Under the coordination of the horizontal expansion mechanism and the horizontal hydraulic cylinder, when horizontal hydraulic cylinders at both sides are stretched to one side at the same time, the second transport vehicle 204 is brought close to or away from the first transport vehicle 106 (i.e., the exhaust joint 205 is close to or away from the exhaust port).

The first transport vehicle 106 and the second transport vehicle 204 are each at least one of a trailer, a truck, a skid or a barge.

The system is transported by two transport vehicles, after reaching the destination, the turbine generation transportation unit 100 is parked according to the well plant layout, and the exhaust auxiliary transportation unit 200 is transported to the side of the turbine generation transportation unit 100 according to the location of the turbine generation transportation unit 100. The head and tail position of the exhaust auxiliary transportation unit 200 is adjusted through the second transport vehicle 204, then the second transport vehicle 204 is finely adjusted in directions of up and down and side to side through the hydraulic walking device to a proper position, after that the exhaust joint 205 is moved to the outside of the exhaust auxiliary transportation unit 200 along the direction close to the turbine generation transportation unit 100 through the slide rail arranged at the bottom, and docked with the exhaust port of the gas turbine 103, and connected tightly with flexible fireproof materials. Meanwhile, the exhaust silencer and the exhaust stack are rotated from horizontal to vertical through the lifting of a hydraulic cylinder arranged at the bottom, and connected tightly to the exhaust joint 205. The retractable flexible ventilating duct 206 in the cabin ventilation and cooling system 202 stretches out toward the turbine generation transportation unit 100, and is connected tightly to the cabin vent of the gas turbine 103, completing the assembly and connection of the mobile power system so that it can enter working state.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A mobile power system, comprising:
   a turbine generation transportation unit and an exhaust auxiliary transportation unit, the exhaust auxiliary transportation unit is connected to at least one side of the turbine generation transportation unit;
   the turbine generation transportation unit comprises an air intake system, a gas turbine, a generator, and a first transport vehicle;
   the air intake system, the gas turbine, and the generator are disposed on the first transport vehicle;
   the gas turbine is configured to convert hydrocarbon fuels into mechanical energy of an output shaft;
   the air intake system is connected to an intake port of the gas turbine through an intake joint, and the intake joint adopts a straight-through joint so that the air intake system is configured to provide combustion-supporting air straightly to the gas turbine without passing through an elbow;
   the generator is disposed at an output end of the gas turbine and is configured to convert mechanical energy into required electrical energy;
   the exhaust auxiliary transportation unit consists of an exhaust system, a cabin ventilation and cooling system, a gas turbine starter, and a second transport vehicle;
   the exhaust system, the cabin ventilation and cooling system, and the gas turbine starter are disposed on the second transport vehicle;
   the exhaust system is connected to an exhaust port of the gas turbine and the cabin ventilation and cooling system is connected to the cabin of the gas turbine.

2. The mobile power system according to claim 1, wherein the turbine generation transportation unit further comprises a power control unit, the power control unit comprises an electric power unit and a control unit, the electric power unit is configured to output electric power from the generator, the control unit comprises a gas turbine control unit and a generator control unit, the gas turbine control unit is configured to act on the gas turbine, and the generator control unit is configured to act on the generator.

3. The mobile power system according to claim 1, wherein the exhaust system comprises an exhaust joint, an exhaust silencer and an exhaust stack which are connected in sequence, the exhaust silencer and the exhaust stack are arranged as a whole, the other end of the exhaust joint is connected to the exhaust port of the gas turbine; during transportation, the exhaust silencer and the exhaust stack are configured to be placed horizontally, and during working state, the exhaust silencer and the exhaust stack are configured to be positioned vertically.

4. The mobile power system according to claim 3, wherein during the working state, the exhaust joint is configured to be moved to the side of the second transport vehicle through a slide rail at the bottom.

5. The mobile power system according to claim 3, wherein during the working state, the exhaust silencer and the exhaust stack are configured to be rotated from horizontal to vertical through a lifting mechanism.

6. The mobile power system according to claim 1, wherein the exhaust system is connected to the side of the turbine generation transportation unit.

7. The mobile power system according to claim 1, wherein the cabin ventilation and cooling system is connected to the side of the turbine generation transportation unit.

8. The mobile power system according to claim 1, wherein the gas turbine starter is configured to start the gas turbine by the mobile power system in totally power failure conditions.

9. The mobile power system according to claim 8, wherein the gas turbine starter is a generator set or a battery capable of self-starting.

10. The mobile power system according to claim 8, wherein the gas turbine starter is connected to the gas turbine, and the gas turbine starter is configured to start the gas turbine in totally power failure conditions independent of other power networks.

* * * * *